(12) United States Patent
Jones et al.

(10) Patent No.: US 7,582,202 B2
(45) Date of Patent: Sep. 1, 2009

(54) COMPOSITION COMPRISING A METAL HYDROXY SALT, ITS PREPARATION AND USE AS CATALYST OR SORBENT

(75) Inventors: William Jones, Cambridge (GB); Paul O'Connor, Hoevelaken (NL); Dennis Stamires, Newport Beach, CA (US)

(73) Assignees: Akzo Nobel N.V. (NL); Albemarle Netherlands B.V. (NL)

( * ) Notice: Subject to any disclaimer, the term of this patent is extended or adjusted under 35 U.S.C. 154(b) by 579 days.

(21) Appl. No.: 10/544,524

(22) PCT Filed: Feb. 10, 2004

(86) PCT No.: PCT/EP2004/001409

§ 371 (c)(1),
(2), (4) Date: Nov. 25, 2005

(87) PCT Pub. No.: WO2004/071653

PCT Pub. Date: Aug. 26, 2004

(65) Prior Publication Data

US 2006/0216229 A1 Sep. 28, 2006

Related U.S. Application Data

(60) Provisional application No. 60/447,007, filed on Feb. 13, 2003.

(30) Foreign Application Priority Data

Feb. 27, 2003 (EP) .................................. 03075588

(51) Int. Cl.
- *B01J 23/00* (2006.01)
- *B01J 21/00* (2006.01)
- *B01J 29/00* (2006.01)
- *B01J 20/00* (2006.01)
- *B01J 37/00* (2006.01)
- *C10G 47/00* (2006.01)
- *C10G 11/00* (2006.01)

(52) U.S. Cl. .......................... 208/111.35; 208/111.01; 208/111.25; 208/112; 208/113; 208/120.1; 208/120.25; 208/120.35; 208/122; 208/124; 208/135; 208/137; 423/239.1; 502/60; 502/63; 502/64; 502/65; 502/66; 502/73; 502/74; 502/87; 502/241; 502/245; 502/250; 502/251; 502/252; 502/253; 502/258; 502/259; 502/260; 502/263; 502/303; 502/326; 502/328; 502/329; 502/331; 502/332; 502/335; 502/336; 502/340; 502/341; 502/342; 502/343; 502/345; 502/346; 502/350; 502/351; 502/415; 502/439

(58) Field of Classification Search .................. 502/60, 502/63, 64, 65, 66, 73, 74, 87, 245, 252, 502/258, 260, 263, 328, 329, 331, 332, 335, 502/336, 341, 342, 343, 350, 351, 355, 415, 502/439, 241, 251, 253, 259, 303, 326, 340, 502/345, 346, 250; 423/239.1; 208/111.01, 208/111.25, 111.35, 112, 113, 120.1, 120.25, 208/120.35, 122, 124, 135, 137
See application file for complete search history.

(56) References Cited

U.S. PATENT DOCUMENTS

| | | | | |
|---|---|---|---|---|
| 3,510,422 A | * | 5/1970 | Cole et al. | 208/120.15 |
| 3,647,682 A | * | 3/1972 | Rabo et al. | 208/120.15 |
| 3,914,383 A | * | 10/1975 | Kirsch et al. | 423/713 |
| 4,199,479 A | * | 4/1980 | Wilkes | 502/174 |
| 4,946,581 A | | 8/1990 | van Broekhoven | 208/120 |
| 4,952,382 A | | 8/1990 | van Broekhoven | 423/244 |
| 5,079,203 A | * | 1/1992 | Pinnavaia et al. | 502/84 |
| 5,114,898 A | * | 5/1992 | Pinnavaia et al. | 502/406 |
| 5,304,601 A | * | 4/1994 | Des Courieres et al. | 502/66 |
| 5,348,725 A | * | 9/1994 | Misra et al. | 423/594.1 |
| 5,358,701 A | | 10/1994 | Pinnavaia et al. | 423/242.1 |
| 5,559,069 A | * | 9/1996 | Rao et al. | 502/226 |
| 5,914,293 A | * | 6/1999 | Bhattacharyya et al. | 502/415 |
| 5,939,353 A | * | 8/1999 | Bhattacharyya et al. | 502/327 |
| 6,716,785 B2 | * | 4/2004 | Stamires et al. | 502/84 |
| 2003/0003035 A1 | | 1/2003 | Stamires et al. | 422/225 |

(Continued)

FOREIGN PATENT DOCUMENTS

WO 99/41195 8/1999

(Continued)

OTHER PUBLICATIONS

H.R. Oswald et al., *Heltica Chimica Acta 47, On the Hydroxide Halides M2 (OH) 3 Cl, Br, I, of Bivalent Metals (M=Mg, Ni, Co, Cu, Fe, Mn)*, pp. 272-289 (1964) (with an English abstract attached).

(Continued)

*Primary Examiner*—Cam N Nguyen
(74) *Attorney, Agent, or Firm*—Louis A. Morris

(57) ABSTRACT

A Composition comprising one or more metal hydroxy salts and a matrix, binder or carrier material, wherein the metal hydroxy salt is a compound comprising (a) as metal either (i) one or more divalent metals, at least one of them being selected from the group consisting of Ni, Co, Ca, Zn, Mg, Fe, and Mn, or (ii) one or more trivalent metal(s), (b) framework hydroxide, and (c) a replaceable anion. This composition has various catalytic applications.

12 Claims, No Drawings

U.S. PATENT DOCUMENTS

2006/0189481 A1* 8/2006 Sanchez Valente et al. .. 502/400

FOREIGN PATENT DOCUMENTS

| WO | 99/41196 | 8/1999 |
| WO | 99/41197 | 8/1999 |
| WO | 99/41198 | 8/1999 |
| WO | 03/078055 | 9/2003 |

OTHER PUBLICATIONS

H. Morioka, et al., *Recent Res. Devel. In Mat. Sci. 1,Preparation and Application of Inorganic Layered Compounds for Anion Exchanged Reaction*, pp. 137-188 (1998).

S. Yamanaka, et al., *Solid State Ionics, 53-56, Anion Exchange Reactions in Layered Basic Copper Salts*, pp. 527-533 (1992).

M. Meyn, et al., *Inorg. Chem, 32, Anion-Exchange Reactions of Hydroxy Double Salts*, pp. 1209-1215 (1993).

P. Porta, et al., *J. Mater. Chem,. 1, Copper-Cobalt Hydroxysalts and Oxysalts: Bulk and Surface Characterization*, pp. 531-537 (1991).

L. Markov, et al., *Russian Journal of Inorganic Chemistry, 30, The Preparation of Solid Solutions Based on Copper and Cobalt Hydroxide Nitrates*, pp. 1718-1720 (1985).

L. Markov, et al., *Reactivity of Solids, 1,Nickel-Cobalt Oxide Spinels Prepared by Thermal Decomposion of Nickel (II)-Cobal (II) Hydroxide Nitrates*, pp. 319-327 (1986).

K. Petrov, et al., *Reactivity of Solids, 3, Thermal Decomposition of Mixed Magnesium(II)-Cobalt(II) Hydroxide Nitrate Crystals to $Mg_xCo_{3-x}Ox$ ($0 < x \leq 1$) Spinels*, pp. 67-74 (1987).

J. Gauthier, *Compt, Rend. 248, Preparation of Some New Basic Copper Salts*, pp. 3170-3172 (1959) (with an English abstract attached).

S.P. Newman, et al., *Journal of Solid State Chemistry, 148, Comparative Study of Some Layered Hydroxide Salts Containing Exchangeable Interlayer Anions*, pp. 26-40 (1999).

C.S. Bruschini, et al., *Cambridge, Royal Society of Chemistry, Progress in Ion Exchange: Advances and Applications* (Eds. A. Dyer, M.J. Hudson, P.A. Williams), pp. 403-411 (1997).

* cited by examiner

COMPOSITION COMPRISING A METAL HYDROXY SALT, ITS PREPARATION AND USE AS CATALYST OR SORBENT

CROSS REFERENCE TO RELATED APPLICATION

This application is a National Phase Application, based on International Application No. PCT/EP2004/001409, filed Feb. 10, 2004, and claims benefit of U.S. Provisional Patent Application Ser. No. 60/447,007, filed on Feb. 13, 2003 and foreign priority Application Serial No. European Patent Application Serial No. 03075588.8, filed on Feb. 27, 2003.

BACKGROUND OF THE INVENTION

1. Field of the Invention

The present invention relates to a composition containing a compound comprising a metal, framework hydroxide, and a replaceable anion.

2. Prior Art

Known compositions containing a compound comprising metal, framework hydroxide, and replaceable anion are compositions comprising anionic clays, i.e. layered double hydroxides or hydrotalcite-like materials. These compositions can suitably be used in fluid catalytic cracking (FCC) processes as catalyst additive or sorbent for the reduction of $SO_x$ and $NO_x$ in FCC regenerators or the production sulfur-lean fuels (see U.S. Pat. Nos. 5,358,701, 4,946,581, 4,952,382, WO 99/41195, WO 99/41196, WO 99/41197, and WO 99/41198).

The invention relates to a new composition suitable for use in FCC. This new composition is especially suitable for reducing $SO_x$ and/or $NO_x$ emissions from FCC regenerators and production of sulfur-lean fuels such as gasoline and diesel.

SUMMARY OF THE INVENTION

In one embodiment, the invention comprises a composition comprising one or more metal hydroxy salts and a matrix, binder, or carrier material.

The metal hydroxy salt is a compound comprising
(a) as metal either (i) one or more divalent metals, at least one of them being selected from the group consisting of Ni, Co, Ca, Zn, Mg, Fe, and Mn, or (ii) one or more trivalent metal(s),
(b) framework hydroxide, and
(c) a replaceable anion.

In a second embodiment, the invention is process selected from the group consisting of fluid catalytic cracking, Fischer-Tropsch synthesis, hydroprocessing, hydrocracking, alkylation, isomerisation, hydrogenation, oxidation, ond NOx removal wherein the composition of claim 1 is used as a catalyst or sorbent in the process.

Other embodiments of the invention relate to details of catalyst or sorbent compositions, all of which are hereinafter described in detail.

DETAILED DESCRIPTION OF THE INVENTION

Matrix, binder, or carrier materials are generally present in catalyst compositions. Their purpose in the composition according to the invention is to bind the metal hydroxy salt(s) and optionally other compounds present in the composition and/or to increase the mechanical strength (attrition resistance or crush strength), surface area, accessibility, and/or thermal stability of the composition.

It has further been found that this new composition is also suitable as a catalyst or sorbent in processes other than FCC. Examples are the removal of noxious gases (e.g., HCN, ammonia, or halogens such as $Cl_2$ and HCl) from steel mills, power plants, and cement plants, the conversion of CO to $CO_2$, NOx reduction from auto exhaust gases, Fischer-Tropsch processes, and hydroprocessing (hydrodesulfurisation, hydrodenitrogenation, emetallisation).

Metal hydroxy salts (MHS) are distinguished from layered double hydroxides (LDH) in that they contain only divalent metals or only trivalent metals, whereas layered double hydroxides comprise both a divalent and a trivalent metal. Furthermore, metal hydroxy salts do not necessarily have a layered structure. They can also have a three-dimensional structure, see *Helv. Chim Acta* 47 (1964), 272-289.

Metal hydroxy salts comprise framework hydroxide. This means: non-replaceable hydroxide bonded to the metal(s). Additionally, metal hydroxy salts contain replaceable anions. The term "replaceable anion" means: anions which have the ability, upon contacting of the MHS with a solution of other anions under suitable conditions, to be replaced (e.g. ion-exchanged) by these other anions.

An example of a MHS is a hydroxy salt of a divalent metal according to the following idealised formula: $[(Me^{2+},M^{2+})_2(OH)_3]^+(X^{n-})_{1/n}$, wherein $Me^{2+}$ and $M^{2+}$ represent the same or different divalent metal ions, OH refers to the framework hydroxide, X is the replaceable anion, and n is the valency of X. Another example of MHS has the general formula $[(Me^{2+},M^{2+})_5(OH)_8]^{2+}(X^{n-})_{2/n}$, wherein $Me^{2+}$ and $M^{2+}$ can be the same or different divalent metal ions, OH refers to the framework hydroxide, X is the replaceable anion, and n is the valency of X.

An example of $[(Me^{2+},M^{2+})_2(OH)_3]^+(X^{n-})_{1/n}$-type MHS is $Cu_xCo_{2-x}(OH)_3NO_3$. If the MHS contains two different metals, the ratio of the relative amounts of the two metals may be close to 1. Alternatively, this ratio may be much higher, meaning that one of the metals predominates over the other. It is important to appreciate that these formulae are ideal and that in practice the overall structure will be maintained although chemical analysis may indicate compositions not satisfying the ideal formula. For example, in layered structures such as $ZnCo_{0.39}(NO_3)_{0.44}(OH)_{2.33}$ and $ZnCu_{1.5}(NO_3)_{1.33}(OH)_{3.88}$ it is ideally pictured that approximately 25% of the framework hydroxides are replaced by $NO_3^-$ ions. In these structures, one oxygen of the $NO_3^-$ ion occupies the position of one framework hydroxide whereas, the other two oxygen ions lie between the layers. The layers may therefore be described with the formula $[(Me^{2+},M^{2+})_2(OH)_3O]^+$.

An example of $[(Me^{2+},M^{2+})_5(OH)_8]^{2+}(X^{n-})_{2/n}$-type MHS is $[(Zn)_5(OH)_8(NO_3)_2)]$. The structure of this material consists of brucite-type $[Zn_3(OH)_8]^{2-}$ layers with 25% of the octahedral positions remaining unoccupied. Above and below these vacant octahedral sites are located tetrahedrally coordinated Zn ions, one on each side of the layer. Such a two-fold replacement of the octahedral Zn ion gives rise to a charge on the layers and the need for charge balancing and replaceable anions within the interlayer. Examples of mixed metal systems based on this structure that have been reported include $Zn_{3.2}Ni_{1.8}(OH)_8(NO_3)_{1.7}(OH)_{0.3}$ and $Zn_{3.6}Ni_{1.4}(OH)_8(NO_3)_{1.6}(OH)_{0.4}$. These two formulae indicate that two (and indeed more) different metals may be present in the layer and that anion exchange may also occur (i.e. $OH^-$ replacing $NO_3^-$).

Yet another example of MHS is illustrated by $[M^{3+}(OH)_2]^+(X^{n-})_{1/n}$, such as $La(OH)_2NO_3$, in which the metal is now trivalent. The ability to introduce La into a composition in this pure state is particularly advantageous to catalyst manufacturers, as will be obvious to those experienced in the art of catalyst manufacture.

As explained above, some of the divalent metal based MHS-structures described above may be considered as an alternating sequence of modified brucite-like layers in which the divalent metal(s) is/are coordinated octrahedrally with the framework hydroxide ions. In one family, the framework hydroxide is partially replaced by other anions (e.g. nitrate). In another family, vacancies in the octahedral layers are accompanied by tetrahedrically coordinated cations. Another structure of metal hydroxides is the three-dimensional structure depicted in *Helv. Chim Acta* 47 (1964), 272-289.

The term "metal hydroxy salt" includes the materials referred to in the prior art as "(layered) hydroxy salt", "(layered) hydroxy double salt", and "layered basic salt". For work on these types of materials reference is made to:

*J. Solid State Chem.* 148 (1999), 26-40
*Recent Res. Devel. In Mat. Sci.* 1 (1998), 137-188
*Solid State Ionics* 53-56 (1992), 527-533
*Inorg. Chem.* 32 (1993), 1209-1215
*J. Mater. Chem.* 1 (1991), 531-537
*Russian J Inorganic Chemistry*, 30, (1985), 1718-1720
*Reactivity of Solids*, 1, (1986), 319-327
*Reactivity of Solids*, 3, (1987), 67-74
*Compt. Rend.* 248, (1959), 3170-3172
C. S. Bruschini and M. J. Hudson, in: *Progress in ion exchange; advances and applications* (Eds. A. Dyer, M. J. Hudson, P. A. Williams), Cambridge, Royal Society of Chemistry, 1997, pp. 403-411.

Examples of hydroxy salts which can suitably be used in the composition according to the present invention and which comprise only one type of metal are Zn-MHS (e.g. $Zn_5(OH)_8(X)_2$, $Zn_4(OH)_6X$, $Zn_5(OH)_6(X)_2.2H_2O$, $Zn_3(OH)_4(X)_2$), Co-MHS (e.g. $Co_2(OH)_3X$, Ni-MHS (e.g. $Ni_2(OH)_3X$), Mg-MHS (e.g. $Mg_2(OH)_3X$), Fe-MHS, Mn-MHS, and La-MHS ($La(OH)_2NO_3$).

Examples of hydroxy salts comprising two or more different types of metals which can suitably be used in the composition according to the present invention are Zn—Cu MHS, Zn—Ni MHS, Zn—Co MHS, Fe—Co MHS, Zn—Mn MHS, Zn—Fe MHS, Ni—Cu MHS, Cu—Co MHS, Cu—Mg MHS, Cu—Mn MHS, Fe—Co MHS, Ni—Co MHS, Zn—Fe—Co MHS, Mg—Fe—Co MHS, and Ni—Cu—Co MHS.

Examples of suitable replaceable inorganic anions $X^{n-}$ are $OH^-$, $NO_3^-$, $NO_2^-$, $CO_3^{2-}$, $HCO_2^-$, $SO_4^{2-}$, $SO_3NH_2^-$, $P_2O_7^{2-}$, $MnO_4^-$, $SCN^-$, $S_2O_6^{2-}$, $Si_8O_{20}^{8-}$, $SeO_4^-$, $F^-$, $Cl^-$, $Br^-$, $I^-$, $ClO_3^-$, $ClO_4^-$, $BrO_3^-$, and $IO_3^-$. Examples of suitable organic replaceable anions are acetate, long-chain carboxylates (e.g. sebacate, caprate, and caprylate (CPL)), alkyl sulphates (e.g. dodecyl sulphate (DS) and dodecylbenzene sulphate), benzoate and phthalocyanine tetrasulphonate. Replacement (e.g. ion-exchange) of these ions has been fully documented in the literature. By controlling the replacement conditions, mixed inorganic/organic compositions may be obtained.

One of the disadvantages of layered double hydroxides is that—if the active metal is the divalent metal—they require the additional presence of a trivalent metal. This may lead to dilution of the active metal, increased costs, undesired side reactions, and the loss of catalytic activity of the active metals. This problem is solved by metal hydroxy salts containing only one type of metal. Furthermore, divalent and trivalent metals are not easily precipitated simultaneously, because they generally precipitate at quite different pHs. Simultaneous precipitation of two different divalent or two different trivalent metals generally is easier. This is another advantage of metal hydroxy salts over layered double hydroxides.

Finally, some of the trivalent metals which are generally used in LDH synthesis (e.g. Ga and Cr) have environmental drawbacks. Metal hydroxy salts containing only divalent metals solve this problem.

The composition according to the invention comprises one or more metal hydroxy salts, preferably in an amount of 2-98 wt % based on the weight of the composition, and all calculated as oxides. In this preferred embodiment, the composition can contain one or more metal hydroxy salts each in amounts below 2 wt %, as long as the total amount of metal hydroxy salt in the composition is in the range of 2-98 wt %. Unless stated to the contrary, all weight percentages of MHS are calculated as metal oxides and based on the total composition calculated as oxides.

More preferred total amounts of MHS in the composition depend on the application. For some applications total MHS amounts of between 60 and 90 wt % (e.g. close to 80 wt %) will be beneficial. For other applications lower amounts will be useful, e.g. between 5 and 20 wt %, preferably close to 10 wt %. For yet other applications a composition comprising close to 50 wt % of MHS will be preferred. Suitable compositions for specific purposes are outlined below.

Metal hydroxy salts can be prepared by several methods, two of them being exemplified hereafter. One method (Method 1) involves the reaction of a metal oxide with a dissolved metal salt, e.g. a nitrate, in a slurry. Another method (Method 2) involves (co-)precipitation from metal salt solutions. It is also possible to have the other compound present in the slurry or solution during formation of the MHS.

For method 1 reference is made to *Inorg. Chem.* 32 (1993), 1209-1215; for method 2 reference is made to *J. Solid State Chem.* 148 (1999), 26-40 and *J. Mater. Chem.* 1 (1991), 531-537. These references all relate to the preparation of hydroxy (double) salts, which materials are covered by the term "metal hydroxy salt".

After preparation of the MHS, the replaceable anions may be exchanged, if so desired, by a regular ion-exchange procedure.

If the MHS is formed from or in the presence of solid compound(s), it may be desirable to mill (one of) these compound(s). In this specification the term "milling" is defined as any method that results in reduction of the particle size. Such a particle size reduction can at the same time result in the formation of reactive surfaces and/or heating of the particles. Instruments that can be used for milling include ball mills, high-shear mixers, colloid mixers, and electrical transducers that can introduce ultrasound waves into a slurry. Low-shear mixing, i.e. stirring that is performed essentially to keep the ingredients in suspension, is not regarded as "milling".

Furthermore, method 1 is preferably conducted in a continuous fashion. More preferably, it is conducted in an apparatus comprising two or more conversion vessels, such as the apparatus described in the patent application published under Nos. US 2003-0003035 A1 and WO 03/078055.

For example, a slurry containing the metal salt and the metal oxide is prepared in a feed preparation vessel, after which the mixture is continuously pumped through two or more conversion vessels. Additives, acids or bases may be added to the mixture in any of the conversion vessels if so desired. Each of the vessels can be adjusted to its own desirable temperature.

The composition further comprises a matrix, binder or carrier material. This matrix, binder or carrier material serves as support for dispersed MHS and/or increases the attrition resistance, surface area, accessibility, thermal stability and/or crush strength of the MHS-containing composition.

Suitable matrix, binder or carrier materials include alumina, silica, silica-alumina, silica-magnesia, clay, titania, titania-alumina, silica-titania, aluminium phosphate, zirconia, cerium oxide, calcium oxide, lantanum oxide, barium oxide, and magnesium oxide.

In a preferred embodiment, a mixture of two or more of these matrix, binder or carrier materials is present in the composition.

Examples of suitable aluminas are boehmite, gibbsite, flash-calcined gibbsite, gel alumina, amorphous alumina, transition alumina (e.g. gamma alumina), and mixtures thereof.

Suitable clays include anionic clays (i.e. layered double hydroxides or hydrotalcite-like materials), smectites or montmorillonites (e.g. hectorite, laponite), (meta)kaolin, dealuminated kaolin, desilicated kaolin, bentonite, halloysite, attapulgite, sepiolite, and mixtures thereof. These clays may optionally be modified, e.g. activated with acid or phosphated. An example of such modified clay is acid-treated bentonite.

In addition to the MHS and the matrix, binder or carrier material, the composition may comprise additional materials such as molecular sieves, metal (hydr)oxides, metal additives, phosphates (e.g. meta- or pyrophosphates), pore regulating agents (e.g. sugars, surfactants, polymers), boria, and combinations thereof.

Molecular sieves include small pore zeolites (e.g. ZSM-5, ZSM-21, zeolite beta, silicalite), faujasite zeolites (e.g. zeolite X or Y, REY, USY, RE-USY), mesoporous oxides (e.g. MCM-type materials and mesoporous aluminas), mordenite, silicoalumina phosphates (SAPOs), aluminium phosphates (AlPOs), and mixtures thereof.

Suitable metal additives include compounds of alkali metals, alkaline earth metals, transition metals (e.g. V, Mo, W, Cr, Mn, Ni, Co, Fe), noble metals (e.g. Pt, Pd, Ru, Rh), and rare earth metals (e.g. Ce, La, Pr, and Nd).

The composition according to the invention can be prepared by (a) slurrying the MHS with binder or matrix material (or a precursor thereof) and optionally other material(s) to be incorporated, or (b) having binder, matrix and/or carrier material (or precursors thereof) present during the preparation of the MHS. The preparation is preferably followed by a shaping step. Suitable shaping methods include spray-drying, pelletising, extrusion (optionally combined with kneading), beading, or any other conventional shaping method used in the catalyst and sorbent fields.

The (shaped) composition can then be calcined, reduced, steamed, rehydrated, ion-exchanged, sulfided and/or nitrided. Sulfidation can be carried out by any method known in the prior art. Generally, it involves contacting the composition with a sulfur-containing compound such as elementary sulfur, hydrogen sulfide, DMDS, or polysulfides. Sulfidation can generally be carried out in situ and/or ex situ.

The invention is also directed to the composition in its sulfided, nitrided, calcined, and reduced forms.

Use in FCC

The composition can suitably be used as catalyst (additive) composition in FCC processes.

For FCC applications Mg-MHS, Zn-MHS, Fe-MHS, Ca-MHS, La-MHS, Mn-MHS, Mg—Fe MHS, Zn—Fe MHS, and Zn—Cu MHS are preferred metal hydroxy salts.

For this application matrix or binder materials are preferred which provide the MHS-containing composition with an attrition index (AI) of not more than 15 and/or a bulk density of at least 0.5 g/ml. Examples of such materials are alumina, silica, silica-alumina, clay, titania, zirconia, titania-zirconia, titania-alumina, and aluminium phosphate.

The attrition index is measured as follows. A bed of particles resides on an attrition plate with three nozzles. The attrition plate is situated within an attrition tube at ambient temperature. Air is forced through the nozzles and the resulting jets bring about upward transport of particles and generated fines. On top of the attrition tube is a separation chamber where the flow dissipates, and most particles larger than about 16 microns fall back into the attrition tube. Smaller particles are collected in a collection bag.

The attrition is measured as the weight percentage of fines collected in the collection bag after 24 hours, based on an imaginary intake of 50 grams. The test is first run for 5 hours to measure the initial (0-5 hours) attrition and then for another 15 hours to get the inherent (5-20 hours) attrition. The Attrition Index (AI) is the extrapolated % attrition after 25 hours. So, more attrition-resistant particles will result in lower AI values.

The bulk density is determined by filling a 25 ml cylinder with an internal diameter of 2 cm and a known weight with catalyst particles. The cylinder is filled until nearly full using a funnel with a stem with an internal diameter of 1 cm, placed 2 cm above the top of the cylinder. The weight of the particles in the filled cylinder is measured and divided by the volume of the cylinder to obtain the bulk density.

If used as FCC catalyst additive, the composition preferably comprises a MHS and alumina. It preferably also comprises a small pore zeolite (such as ZSM-5) and clay (e.g. kaolin). More preferably, it also comprises silica, silica-alumina, and/or phosphate.

The additive preferably comprises comprise 2 to 30 wt %, more preferably 5 to 20, and most preferably 10 to 15 wt % of MHS. The additive further preferably comprises 10 to 80 wt %, more preferably 20 to 60 wt %, and most preferably 20 to 40 wt % of alumina. It further preferably comprises 10 to 70 wt % of clay, more preferably 20 to 60 wt % of clay.

A typical composition suitable as FCC additive comprises 15 wt % MHS, 30 wt % alumina, and 55 wt % clay. Another suitable example is a composition comprising 15 wt % MHS, 30 wt % alumina, 30 wt % clay, and 25 wt % of a small pore zeolite.

If used as FCC catalyst, the composition preferably comprises MHS, alumina, clay (e.g. kaolin), and a molecular sieve. Preferred molecular sieves are faujasite zeolites (Y, RE-Y, USY, RE-USY) mordenite, small pore zeolites (e.g. ZSM-5, ZSM-21, zeolite-beta), silicoalumina phosphates (SAPOs), aluminium phosphates (AlPOs) and/or (modified forms of) mesoporous materials such as MCM-41 or mesoporous alumina. More preferred molecular sieves for this purpose are faujasite zeolites, ZSM-5, and a combination thereof. More preferably, such additives comprise 2 to 15 wt % of MHS, 10 to 20 wt % of alumina, 30 to 50 wt % of clay, and 20 to 45 wt % of molecular sieve. Even more preferably, such additives comprise 5 to 10 wt % of MHS, 15 to 20 wt % of alumina, 30 to 50 wt % of clay, and 20 to 30 wt % of molecular sieve.

Compositions according to the invention for use as FCC catalyst can be prepared by mixing in an aqueous slurry about 15 to 45 wt % of a rare-earth exchanged and/or ultrastable zeolite with a binder or matrix material or precursor thereof (e.g. aluminium chlorohydrol, (peptised) pseudoboehmite, micro-crystalline boehmite, silica sol, sodium silicate, silica-alumina co-gel and/or kaolin clay), MHS, and optionally metal additives (e.g. transition metal salts, alkaline earth metal salts, rare earth metal salts, and noble metal salts) and other materials (or precursors thereof) which are desirably present in the resulting composition. Typically, combinations of binders can be used, such as silica sol and peptised pseudo-boehmite, in proportions ranging from 2 to 10 wt % and from 10 to 20 wt %, respectively, based on the weight of the total composition.

The slurry is homogenised either by high-shear mixing or milling. Acids or bases may be added to affect the viscosity in such a way that the product can be spray-dried. The slurry is then spray-dried to form microspherical particles. For other cracking processes, such as TCC and DCC, extrudates or pellets are desired instead of microspheres.

Alternatively, the MHS is prepared in the presence of one or more ingredients of the final composition.

Preferably, the compositions to be used in FCC also comprise a metal selected from the group of vanadium, tungsten, cerium, lanthanum, platinum, and palladium.

When used in FCC, the composition according to the invention can suitably assist in reducing SOx and/or NOx emissions and/or reducing the sulfur and/or nitrogen content of the fuels produced.

However, the compositions can also be used as sorbent for, e.g., halogens ($Cl_2$, HCl), HCN, $NH_3$, SOx and/or NOx from flue gases of for instance power plants. For these purposes, the composition preferably comprises alumina or silica-alumina. In addition, it may comprise phosphates, titania, and zirconia.

Before use in FCC the composition is preferably calcined.

Use in HPC

The composition according to the invention is also suitable as a hydro-processing (HPC) catalyst, in particular when it comprises Ni-MHS or Co—Ni MHS.

Suitable matrix, binder or carrier materials for use in HPC include alumina, silica, silica-alumina, and alumina-titania. These binder or matrix materials serve to provide MHS-containing particles with a suitable crush strength.

These compositions may also comprise magnesia, zirconia, boria, titania, or mixtures thereof, and metal salts, such as molybdate or tungstate salts. The latter salts can be deposited on the composition by, e.g., impregnation, precipitation or ion-exchange, or can be added during preparation of the composition.

Preferred compositions for use in HPC comprise 5 to 75 wt % MHS, 20 to 95 wt % alumina, and 2 to 10 wt % of one or more metals, such as W and/or Mo. Exemplified are compositions comprising 70 wt % of a Mo-impregnated Co—Ni MHS and 30 wt % alumina and compositions comprising 70 wt % of a Mo— and W-impregnated Co—Ni MHS and 30 wt % alumina.

One way of preparing such compositions is by adding the MHS and metal additives (such as molybdate or tungstate salts) to the binder or matrix material(s) or precursor(s) thereof (such as pseudoboehmite) and shaping (e.g. extruding) the resulting mixture. The extrudates are then dried. Before use in HPC, the composition is sulfided, preferably after a calcination and/or reduction step.

Use in Fischer-Tropsch

The composition is also suitable as a Fischer-Tropsch catalyst, especially when comprising a Fe and/or Co-containing MHS. Suitable compositions contain, for example, Fe-MHS, Fe—Co MHS, Co-MHS, Fe—Zn MHS, Co—Fe MHS, Ni—Co-MHS and/or Zn—Co—Fe-MHS.

In addition to MHS, such compositions preferably comprise alumina as binder, matrix or carrier material.

Compositions according to the invention for use as a Fischer Tropsch catalyst can be prepared by slurrying a suitable metal hydroxy salt with alumina, e.g. pseudoboehmite. Preferably, the MHS is present in this slurry as colloidal particles, which are deposited on the alumina (e.g. boehmite crystals). The latter then serves as a carrier for the MHS. Additionally, other metal compounds can be added, such as iron, zinc, cobalt and/or ruthenium-containing compounds.

Alternatively, alumina compound is present during preparation of the MHS.

The resulting product is homogenised by milling or kneading, and finally extruded and dried.

Before use in a Fischer-Tropsch process, the composition is preferably calcined, followed by reduction in a hydrogen atmosphere.

Other applications

The composition according to the invention can also be used as additive for the conversion of CO to $CO_2$, in hydrocracking, hydrogenation, dehydrogenation, alkylation, isomerisation, Friedel Crafts processes, ammonia synthesis, NOx adsorption and/or reduction in auto exhaust systems, etc. Before use in these applications, the composition can be calcined, reduced and/or treated with S- or N-containing compounds. The calcined form is particularly preferred for applications involving the removal of pollutants from gas streams such as those in auto exhaust systems.

Furthermore, the composition can be treated with organic agents, thereby making the surface of the composition, which generally is hydrophilic in nature, more hydrophobic. This allows the composition to disperse more easily in organic media.

Compositions suitable for the above purposes preferably comprise 50-95 wt % of matrix, binder or carrier material, 5-50 wt % of metal hydroxy salt, and 0.05 to 5 wt % of a noble metal, such as Rh, Pd or Ru.

It is also possible to delaminate or exfoliate the MHS—before admixing it with the matrix, binder or carrier material and optional other composition ingredients—by introducing an intercalating agent between the layers and treating the MHS with, e.g., an organic liquid, ultrasound, or high shear. The stacking order of the MHS layers will be distorted by this treatment through (partial) delayering of the structure.

When applied as nanocomposites (i.e. particles with a diameter of less than about 500 nm), the composition according to the invention can suitably be used in plastics, resins, rubbers, and polymers. Nanocomposites with a hydrophobic surface, for instance obtained by treatment with an organic agent, are especially suited for this purpose.

EXAMPLES

Example 1

A sample of Zn-MHS was prepared using the precipitation method of S. P. Newman and W. Jones, *J. Solid State Chemistry* 148 (1999), 26-40, and the washed and dried material was combined in a slurry with Catapal® alumina (a quasi-crystalline boehmite) peptised with nitric acid. The slurry was homogenised by high shear-mixing and subsequently dried. The resulting composition comprised, calculated as oxides, 15 wt % Zn-MHS and 85 wt % alumina.

The powder was ground to particles with a size of less than 4 microns and was mixed with a conventional FCC catalyst and tested in a microactivity (MAT) testing unit. This test showed the presence of the composition according to the invention resulted in about 35% reduction of the sulfur content of the gasoline.

Example 2

A portion of the powder prepared in Example 1 was added to a slurry containing 25 wt % RE-exchanged zeolite Y, 22 wt % alumina, and 23 wt % clay, based on total solids content and calculated as oxides. The slurry was mixed and spray-dried. The resulting composition contained about 30 wt % of the composition produced in Example 1.

The composition was subsequently tested in a FCC microactivity unit. The test showed about 42% reduction of the sulfur content of the gasoline compared to the conventional FCC catalyst mentioned in Example 1.

Example 3

A Mg-MHS was prepared according to the reference cited in Example 1. This MHS was mixed with high shear with a pseudoboehmite peptised with formic acid in proportions to obtain a Mg to Al mole ratio of about 3. To this homogeneous mixture a Cu-MHS was added in an amount sufficient to obtain a mixture containing about 20 wt % of Cu, calculated as CuO and based on dry weight.

The mixture was mixed with high shear and subsequently dried to form a powder. This powder was calcined at 500° C. for 3 hours and then mixed with a conventional FCC catalyst. The resulting product was tested in a microactivity test unit according to Example 2. A 47% reduction of the $NO_x$ and $SO_x$ contents of the regenerator gas was observed compared to the use of the FCC catalyst alone.

Example 4

A Mg-MHS was prepared according to Example 3. A portion of this Mg-MHS was high-shear mixed with Catapal® alumina (peptised with nitric acid) in a Mg/Al mole ratio of about 3. Subsequently, 12 wt % cerium nitrate and 5 wt % ammonium vanadate (based on the weight of the final product and calculated as $CeO_2$ and $V_2O_5$, respectively) were added to the mixture. The mixture was dried at 100° C. to form a powder.

The powder was calcined at 500° C. for 3 hours and mixed with a conventional FCC catalyst, and then tested in a microactivity test unit. These tests indicated about 65% reduction of the $SO_x$ content of the gaseous emission of the regenerator, as well as a reduction of the sulfur content of the gasoline and diesel fuel liquid products compared to the use of the conventional FCC catalyst alone.

Example 5

A Zn-MHS was prepared according to Example 1. This Zn-MHS was mixed with peptised Catapal® in aqueous suspension. To this mixture ammonium tungstate was added.

The mixture was milled and subsequently dried at 100° C. to form a powder. The resulting composition comprised 30 wt % of Zn-MHS (calculated as ZnO), 67 wt % of alumina (calculated as $Al_2O_3$), and 3 wt % ammonium tungstate (calculated as $WO_3$).

The powder was milled to obtain a particle size of less than 4 microns, calcined at 500° C. for 3 hours, and then mixed with a conventional FCC catalyst and tested in a FCC pilot plant using a sulfur-containing oil feed.

This test indicated about 38% reduction of the sulfur content of the gasoline and diesel liquid products compared to the use of the conventional FCC catalyst alone.

Example 6

Mg-MHS, prepared according to Example 3, was high-shear mixed in aqueous suspension with flash-calcined gibbsite in a Mg/Al mole ratio of 2. Ammonium heptamolybdate (8 wt % based on dry weight and calculated as $MoO_3$) was added to this suspension.

The mixture was milled and subsequently spray-dried to form microspheres. These microspheres were calcined, mixed with a conventional FCC catalyst, and tested in a FCC pilot plant using a sulfur-containing oil feed.

This test indicated a substantial reduction of the sulfur content of the gasoline liquid products compared to the use of only the conventional FCC catalyst.

Example 7

Example 6 was repeated, except that the suspension was aged at 160° C. for one hour before being spray-dried. The test results indicated a reduction of the sulfur content of the gasoline liquid product comparable to that in Example 6.

Example 8

Example 7 was repeated, except that the flash-calcined gibbsite was replaced with finely ground gibbsite. The test results indicated a similar reduction of the sulfur content of the gasoline to that in Example 6.

Example 9

Zn-MHS prepared according to Example 1 was high-shear mixed in aqueous suspension with flash-calcined gibbsite and 2 wt % of ammonium vanadate. The mixture was spray-dried to form microspheres. The resulting composition comprised 20 wt % of Zn-MHS (calculated as ZnO), 78 wt % of alumina (calculated as $Al_2O_3$), and 2 wt % of vanadium (calculated as $V_2O_5$).

The microspheres were calcined, mixed with a conventional FCC catalyst, and tested in a FCC pilot plant using a sulfur-containing oil feed. This test indicated a similar reduction of the sulfur content of the gasoline and diesel liquid products to that in Example 5.

Example 10

A Mg-MHS prepared according to Example 3 was high-shear mixed in aqueous suspension with flash-calcined gibbsite (in a Mg/Al mole ratio of 3) and 12 wt % of cerium acetate (calculated as $CeO_2$ and based on the final composition) and spray-dried to form microspheres.

The microspheres were then calcined and subsequently slurried at 85° C. in an aqueous solution of ammonium vanadate. The final product contained about 3 wt % vanadium, calculated as $V_2O_3$. The material showed substantial reduction of the SOx content of the regenerator gas.

Example 11

A mixture of Cu-MHS and La-MHS was prepared. To this mixture a Mg-MHS was added, followed by the addition of an aluminium hydroxide gel. Equal moles of Cu and La were present in the mixture. The mixture was high-shear mixed and spray-dried to form microspheres. The composition of the mixture was such that the Cu:La:Mg:Al atom ratio was 1:1:0.5:0.1.

The microspheres were mixed with a conventional FCC catalyst and the composite calcined and tested in a FCC pilot plant using an oil feed that contained nitrogen. A 58% reduction of the $NO_x$ content of the regenerator gas was observed compared to the use of the FCC catalyst alone.

Example 12

A mixture of Co-MHS and Ni-MHS was prepared which contained about equal molar portions of Co and Ni. The mixture was high-shear mixed with Catapal® alumina (peptised with nitric acid). The alumina content of the mixture, calculated as $Al_2O_3$, was about 70 wt %, based on dry weight.

The mixture was extruded and the extrudates were calcined. In a high-pressure reactor these extrudates were tested for HDS/HDN activity under standard hydrodesulfurisation conditions. The extrudates exhibited comparable activity to standard HDS/HDN catalysts.

Example 13

A mixture of Co-MHS and Ni-MHS was prepared which contained about equal molar portions of Co and Ni. To this mixture, ammonium heptamolybdate was added along with peptised Catapal® alumina. The mixture was high-shear mixed. The resulting composition had a Ni:Co:Mo:Al atom ratio of 1:0.7:0.7:1. The mixture was extruded and the extrudates were calcined, sulfided, and tested in a HPC high-pressure unit for desulfurisation activity. The product showed a reduction of the sulfur and nitrogen contents of the liquid products comparable to commercial catalyst products.

Example 14

A Ni-MHS was impregnated with an ammonium heptamolybdate solution and an ammonium tungstate solution. The metals were present in a Ni:Mo:W weight ratio of 1:0.68:0.32. The mixture was milled with phosphated bentonite in such amounts as to result in an atom ratio Ni/Al of 0.25.

The final mixture was extruded, dried, calcined, sulfided, and tested in a high-pressure hydrogen reactor for desulfurising activity using a high sulfur-containing oil feed. The desulfurising activity, observed under standard hydroprocessing conditions for HDS and HDN activity, was similar to that of Example 13.

Example 15

Example 14 was repeated, except that phosphated bentonite was replaced by aluminum phosphate binder. The test results indicated comparable HDS/HDN activities to those of Example 13.

Example 16

Example 14 was repeated, except that phosphated bentonite was replaced by titanium gel. The test results indicated comparable HDS/HDN activities to those of Example 13.

Example 17

Cu-MHS, Mn-MHS and La-MHS were mixed with a chromia gel (made by precipitating a chromium nitrate solution) with high shear using equal molar ratios of Cu, Mn, Cr, and La. The mixture was spray-dried and subsequently calcined at about 800-900° C.

The calcined microspheres were milled to fine particles and then mixed with 42 wt % (based on dry weight) of a mixture of Mg-MHS and flash-calcined gibbsite in a Mg/Al atom ratio of 3. The resulting mixture was milled, spray-dried to form microspheres, and finally calcined at 600° C. The calcined product was mixed with a conventional FCC catalyst and tested in a FCC pilot plant using an oil feed that contained nitrogen. A substantial reduction of the $NO_x$ content of the regenerator gas was observed compared to the use of the FCC catalyst alone.

Example 18

La-MHS and Mg-MHS were mixed together in amounts corresponding to a Mg/La molar ratio of 1. To this mixture Catapal® alumina, peptised with nitric acid, was added such that the Mg/Al molar ratio was 3. The resulting mixture was milled and spray-dried to form microspheres.

The microspheres were calcined at 600° C. and then used as a catalyst additive in a FCC pilot plant using a heavy resid oil feed. The test results indicated that the presence of this catalyst additive reduced (i) the deactivation of the FCC catalyst due to metal (Ni, V, Fe, Cu) poisoning, and (ii) the $SO_x$ and $NO_x$ contents of the regenerator gaseous emission.

Example 19

Example 18 was repeated, except that the acid peptised Catapal® alumina was replaced with an equal amount of aluminum nitrate precipitated with ammonium hydroxide. FCC pilot plant results indicated similar amounts of metal passivation and $SO_x$ and $NO_x$ reduction.

Example 20

A Cu—Mg MHS was slurried with Catapal® alumina peptised with nitric acid in amounts leading to a mixture containing 26 wt % of Cu, 26 wt % of Mg, and 48 wt % Al, all calculated as oxides and based on total solids content. The mixture was milled, spray-dried to form microspheres, and calcined. The resulting product was tested in a microactivity test unit according to Example 11. A significant reduction of the SOx content of the regenerator gas was observed.

Example 21

A Cu-MHS, a Mn-MHS, and a La-MHS were mixed. The Cu:Mn:La atom ratio amounted to 1:1:1. Said mixture was dried, calcined at 800° C. for 3 hours, milled, slurried with 40 wt % of peptised boehmite (calculated as oxide and based on dry solids weight), and finally spray-dried to form microspheres.

The microspheres were mixed with a conventional FCC catalyst and tested in a FCC pilot plant using an oil feed that contained nitrogen. A substantial reduction of the $NO_x$ content of the regenerator gas was observed.

Example 22

A Co-MHS was slurried with a Mg-Al anionic clay in a Mg/Al molar ratio of 3. The Co/Mg molar ratio was 0.5. The product was dried at 100° C. and then calcined at 500° C. for 3 hours.

Example 23

The product of Example 22 was slurried with 40 wt % of a formic acid peptised Catapal® alumina (calculated as oxide and based on dry solids weight) and spray-dried to give microspheres. The microspheres were then mixed with a conventional FCC catalyst (20 wt % of the additive and 80 wt % of the FCC catalyst) and the mixture was calcined at 500° C. for 3 hours. The product was tested in a microactivity test unit and showed good $SO_x$ reduction activity.

Example 24

A mixture of a Cu-MHS and Zn-MHS was prepared in water and peptised Catapal® alumina was added (Cu:Zn:Al molar ratio 1:1:1). The slurry was spray-dried, calcined at 500° C. for 4 hours, mixed with a conventional FCC catalyst, and calcined again at 500° C. for 3 hours. The resulting mixture was tested in a microactivity test unit and showed good SOx and NOx reduction activity.

The invention claimed is:

1. A composition comprising one or more metal hydroxy salts and a matrix, binder or carrier material, wherein the metal hydroxy salt is a compound comprising (a) as the metal either (i) one or more divalent metals, at least one of them being selected from the group consisting of Ni, Co, Ca, Zn, Mg, Fe, and Mn, or (ii) one or more trivalent metal(s), (b) a framework hydroxide, and (c) a replaceable anion.

2. The composition of claim 1 comprising 2-98 wt % of metal hydroxy salt, based on the total weight of the composition.

3. The composition of claim 1 wherein at least one of the metal hydroxy salts comprises divalent metal.

4. The composition of claim 3 wherein the metal hydroxy salt contains one divalent metal selected from the group consisting of Ni, Co, Ca, Zn, Mg, Fe, and Mn.

5. The composition of claim 3 wherein the metal hydroxy salt contains at least two different types of divalent metals.

6. The composition of claim 5 wherein the metal hydroxy salt is selected from the group consisting of Zn—Cu MHS, Zn—Ni MHS, Zn—Co MHS, Fe—Co MHS Fe—Mg MHS, Zn—Mn MHS, Zn—Fe MHS, Ni—Cu MHS, Cu—Co MHS, Cu—Mg MHS, Cu—Mn MHS, Fe—Co MHS, Ni—Co MHS, Zn—Fe—Co MHS, Mg—Fe—Co MHS, and Ni—Cu—Co MHS.

7. The composition of claim 1 wherein at least one of the metal hydroxy salts contains trivalent metal.

8. The composition of claim 7 wherein the trivalent metal is La.

9. The composition of claim 1 wherein the matrix, binder or carrier material is selected from the group consisting of alumina, silica, silica-alumina, silica-magnesia, alumina-titania, clay, titania, zirconia, and aluminum phosphate.

10. The composition of claim 1 additionally comprising a molecular sieve.

11. A process selected from the group consisting of fluid catalytic cracking, Fischer-Tropsch synthesis, hydroprocessing, hydrocracking, alkylation, isomerization, hydrogenation, oxidation, and NOx removal, using the composition of claim 1 as a catalyst or sorbent.

12. The process of claim 11 wherein the catalyst or sorbent is in a calcined form.

* * * * *